United States Patent
Bogle

(10) Patent No.: US 8,157,083 B2
(45) Date of Patent: Apr. 17, 2012

(54) SELF-CLEARING CONVEYOR TRANSFER SYSTEM AND TRANSFER PLATE

(75) Inventor: David W. Bogle, Round Rock, TX (US)

(73) Assignee: Laitran, L.L.C., Haraham (LA)

(*) Notice: Subject to any disclaimer, the term of this patent is extended or adjusted under 35 U.S.C. 154(b) by 252 days.

(21) Appl. No.: 12/645,543

(22) Filed: Dec. 23, 2009

(65) Prior Publication Data

US 2011/0147162 A1   Jun. 23, 2011

(51) Int. Cl.
*B65G 47/66* (2006.01)
(52) U.S. Cl. .................................... 198/599
(58) Field of Classification Search .......... 198/599, 198/600, 605, 635
See application file for complete search history.

(56) References Cited

U.S. PATENT DOCUMENTS

| | | | |
|---|---|---|---|
| 2,624,444 A | 1/1953 | Casabona | |
| 4,143,756 A | 3/1979 | Chorlton | |
| 4,313,536 A | 2/1982 | Fauth | |
| 4,613,036 A | 9/1986 | Bourgeois | |
| 4,828,103 A | 5/1989 | Fauth, Sr. | |
| 5,038,923 A | 8/1991 | Evans | |
| 5,044,485 A | 9/1991 | Loder | |
| 5,215,182 A | 6/1993 | Garbagnati | |
| 5,551,554 A * | 9/1996 | Wilson et al. | 198/636 |
| 5,584,373 A | 12/1996 | Layne | |
| 5,597,062 A | 1/1997 | Biwer | |
| 5,749,454 A | 5/1998 | Layne | |
| 5,850,902 A * | 12/1998 | Hicks et al. | 198/457.05 |
| 5,908,104 A | 6/1999 | Brun-Jarret | |
| 5,957,265 A | 9/1999 | Clopton | |
| 5,996,764 A | 12/1999 | Barkley | |
| 6,138,819 A | 10/2000 | Bogle et al. | |
| 7,314,130 B2 * | 1/2008 | de Geus et al. | 198/635 |
| 7,448,490 B2 | 11/2008 | de Geus et al. | |
| 2006/0108204 A1 | 5/2006 | Marsetti | |

OTHER PUBLICATIONS

International Search Report and Written Opinion of the International Searching Authority of PCT/US10/61312, mailed Mar. 28, 2011, European Patent Office, Rijswijk, NL.

* cited by examiner

*Primary Examiner* — Douglas Hess
(74) *Attorney, Agent, or Firm* — James T. Cronvich

(57) ABSTRACT

A self-clearing conveyor transfer system for transferring articles between two mutually perpendicular conveyor belts. One version of the transfer system includes a finger transfer plate with fingers at one end extending into the end of a raised-rib belt and powered rollers at the opposite end rotating about axes perpendicular to the fingers. A second conveyor belt perpendicular to the raised-rib belt advances parallel to the roller axes. Articles transfer from one belt to the other across the finger transfer plate. Because the rollers are powered, straggling articles are not stranded on the transfer plate.

20 Claims, 3 Drawing Sheets

SELF-CLEARING CONVEYOR TRANSFER SYSTEM AND TRANSFER PLATE

BACKGROUND

The invention relates generally to power-driven conveyors and more particularly to transfer systems providing a surface over which articles are transferred between mutually perpendicular conveyor belts.

Many conveying applications require that articles conveyed on a first conveyor belt be transferred off the end of the belt onto a second conveyor belt transverse to the first conveyor belt. Dead plates positioned in the gap between the end of the first conveyor belt and the side of the second conveyor belt provide a slide surface over which articles are pushed toward the second conveyor belt. In pasteurizer discharge applications, for example, the first conveyor belt is typically a wide raised-rib belt conveying bottles or cans through a pasteurizer. The bottles or cans sit atop spaced apart ribs forming the belt's conveying surface. One or more plates having a series of parallel fingers are arranged at the discharge end of the raised-rib belt with the fingers extending between the ribs to strip bottles or cans from belt. Because of the space required at the discharge end of the raised-rib belt to accommodate the belt's path around its sprockets, the discharge belt cannot be positioned too close to the raised-rib belt. So the length of the slide surface of the finger plate between the two belts is typically greater than the footprint of the bottles or cans. Trailing bottles or cans push leading bottles or cans across the fingers and onto a discharge conveyor belt. But straggling bottles or cans in a batch can be stranded on the finger plate. Manual intervention is then necessary to push the stranded stragglers onto the discharge conveyor.

One solution to the problem with stranded bottles or cans is addressed in U.S. Pat. No. 7,314,130 to de Geus et al., which describes a finger plate with a recessed rear portion that supports an intermediate conveyor belt between the fingers and the discharge belt. The intermediate belt advances parallel to the discharge belt. A guide rail at a downstream end of the intermediate belt guides the bottles or cans onto the discharge belt. The edge of the intermediate belt closer to the raised-rib belt has a thin cantilevered edge that allows it to extend over the raised-rib sprockets without interference into close proximity to the rear of the fingers. In this way, the distance along the finger plate between the release point of the bottles or cans from the raised-rib belt onto the fingers and the edge of the intermediate belt is less than the footprint of the bottles or cans. Consequently, even the last bottles or cans are drawn onto the intermediate conveyor belt and directed to the discharge belt without being stranded. But this system requires that the guide rails be set correctly to guarantee that stragglers clear. And the intermediate belt is subject to lifting when broken glass pieces from bottles wedge themselves under the transfer edge. Furthermore, space limitations, especially in existing pasteurizer layouts, often do not allow room for an intermediate belt to be installed.

SUMMARY

These shortcomings are addressed by a transfer system embodying features of the invention. In one version, the transfer system includes a transfer plate that has a cantilevered portion at a first end and a rear portion at an opposite second end. The cantilevered portion extends outward of the first end in a first direction to a distal end and forms an upper transfer surface. The rear portion includes an alternating series of grooves and ridges that extend in the second direction perpendicular to the first direction. In the transfer system, rollers are supported in the grooves along roller axes in the second direction. A salient portion of each roller extends above the ridges. A roller drive coupled to the rollers rotates the rollers about the roller axes. A conveyor belt having an outer conveying surface advances along the first direction. The outer conveying surface is proximate to the distal end of the cantilevered portion.

Another version of a transfer system comprises a transfer plate that includes a cantilevered portion at a first end and a recessed rear portion at an opposite second end. The cantilevered portion extends outward of the transfer plate in a first direction to a distal end. A reversing element is disposed partly below the cantilevered portion of the transfer plate. A first conveyor belt advances along the first direction and around the reversing element. An outer conveying surface of the first conveyor belt is proximate to the distal end of the cantilevered portion of the transfer plate. Rollers are supported in the recessed rear portion along roller axes that are parallel to the second direction. A roller drive coupled to the rollers rotates the rollers about the roller axes.

Another version of a transfer system comprises a conveyor belt advancing on an upper carryway run along a first direction. The conveyor belt has a series of ribs parallel to the first direction separated by spaces. A sprocket engages the conveyor belt and redirects the belt between the upper carryway run and a lower return run. Parallel fingers extend along the upper carryway run above the sprocket. The fingers extend into the spaces between the ribs of the conveyor belt. Parallel powered rollers are disposed adjacent to the fingers. The rollers rotate on roller axes perpendicular to the first direction. The rollers roll the articles along the first direction.

BRIEF DESCRIPTION OF THE DRAWINGS

These features and versions of the invention, as well as its advantages, are better understood by referring to the following description, appended claims, and accompanying drawings, in which:

DETAILED DESCRIPTION

Figure 1:
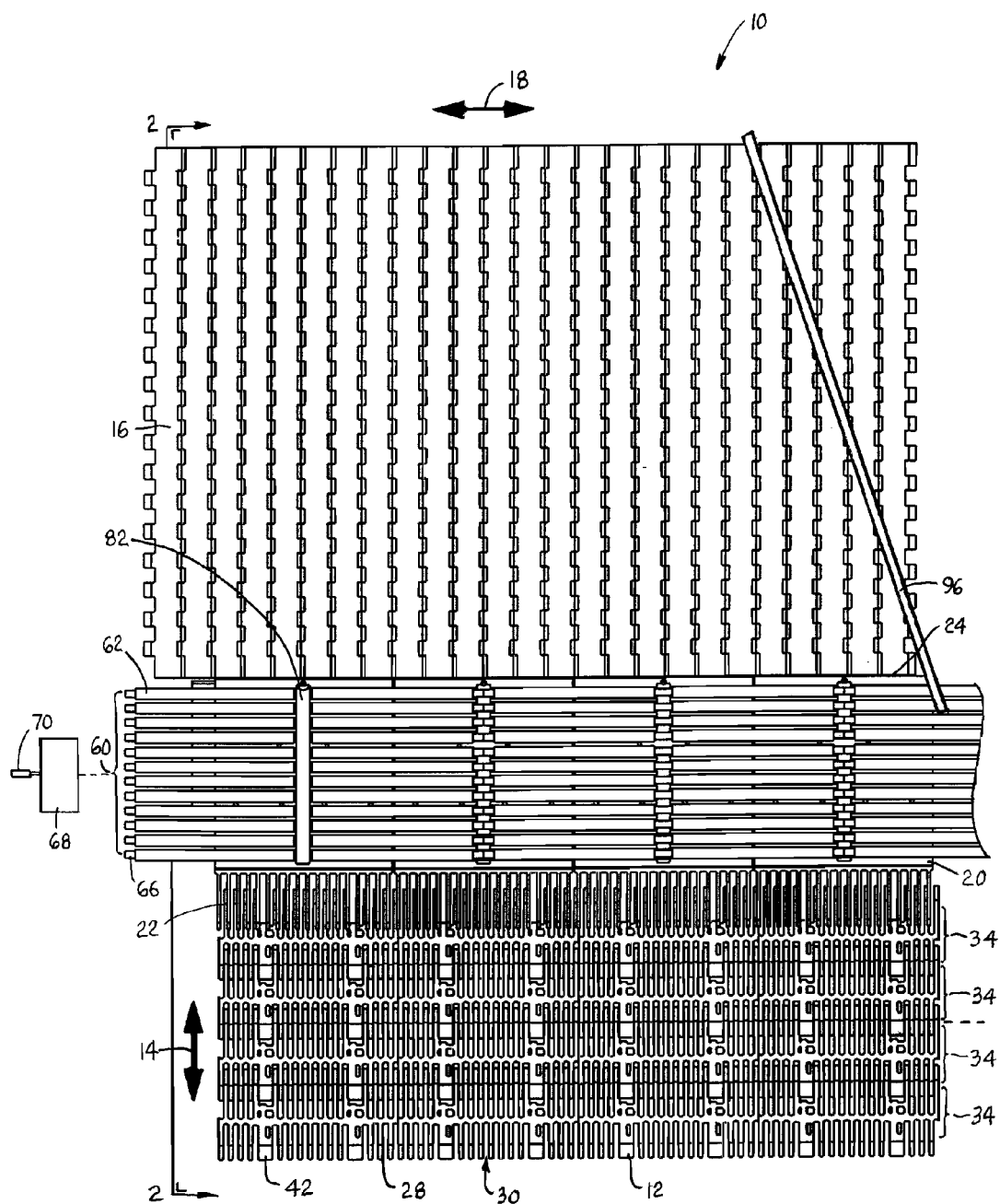
FIG. 1 is a top plan view of a portion of a transfer system embodying features of the invention.
Figure 2:
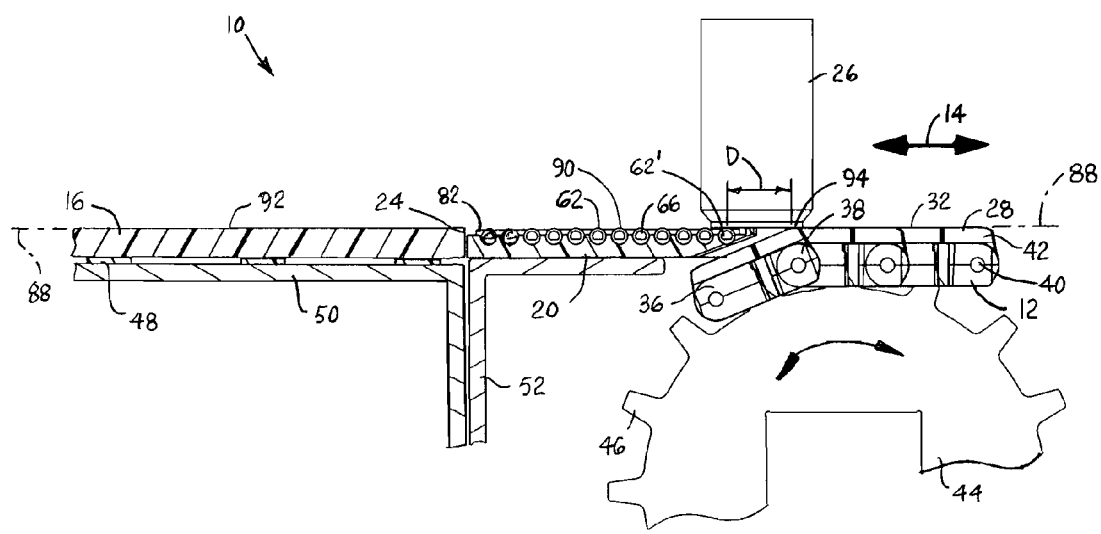
FIG. 2 is a side cross section of the transfer system of FIG. 1 taken along lines 2-2.
Figure 3:
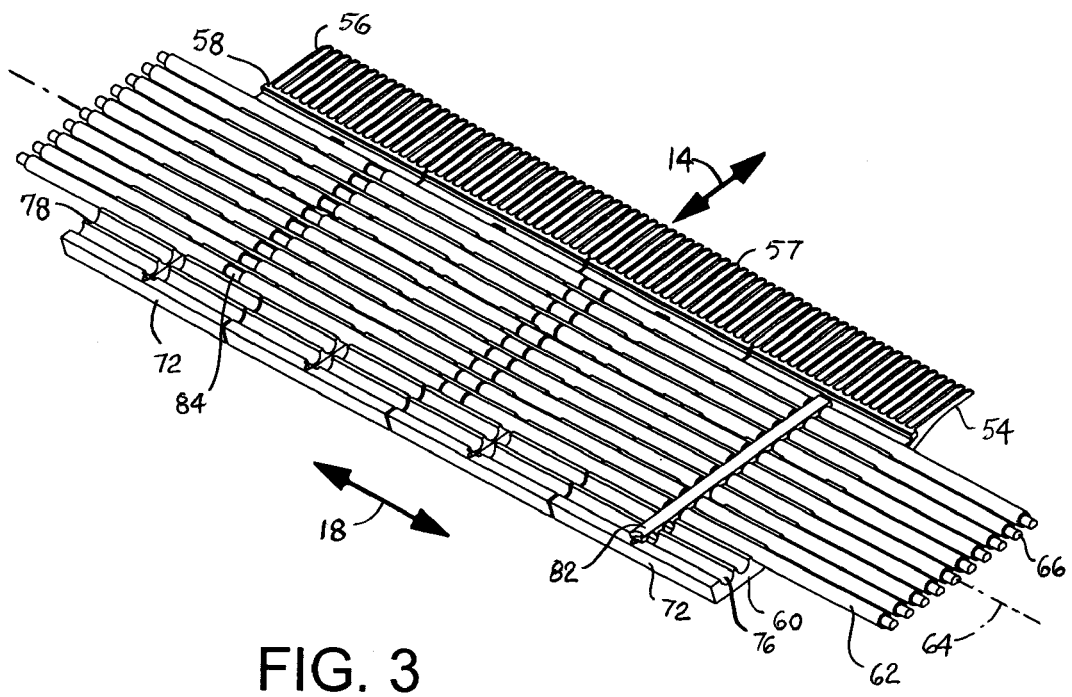
FIG. 3 is an isometric view of a portion of the transfer system of FIG. 1 with some of the rollers removed.

A conveyor transfer system embodying features of the invention as shown in FIGS. 1-3. The transfer system 10 comprises a first conveyor belt 12, such as a raised-rib conveyor belt, advancing in either direction along a first direction of belt travel 14 and a second conveyor belt 16 advancing in either direction transverse to the first conveyor belt along a second direction 18 perpendicular to the first direction. A transfer device 20 is positioned between one end 22 of the raised-rib belt 12 and a side 24 of the second conveyor belt 16. The transfer device provides a conveying surface over which articles, such as cans 26, can ride in moving between the two belts.

The raised-rib belt 12, such as an Intralox® Series 1900 Raised Rib belt manufactured and sold by Intralox, L.L.C. of Harahan, La., U.S.A., has a series of parallel ribs 28 running in the first direction 14 and separated by spaces 30. Conveyed articles are supported on the tops 32 of the ribs, which form an outer conveying surface of the belt. A raised-rib belt is shown because the transfer device is described in a pasteurizer system, but other kinds of belts, such as flush-grid or flat belts, may be more appropriate in other applications. The second conveyor belt 16 may be a modular plastic conveyor belt, as in FIG. 1, or, as other examples, a flat belt, a metal belt, or a flat-top chain. Alternatively, the second conveyor belt could be replaced by a conveyor other than a belt or chain conveyor to transport articles along the second direction 18.

The raised-rib belt 12 is constructed of a series of rows 34 of one or more belt modules 36 linked together at hinges 38 by hinge rods 40. The belt transports articles 26 along an upper carryway run 42. A reversing element, such as a shaft-mounted sprocket 44 or sprocket set with teeth 46 that engage structure in the inner side of the belt, redirect the belt 12 in its transition between the upper carryway run 42 and a lower return run (not shown) below the sprocket. In a pasteurizer application, the raised-rib belt is typically wide and may be realized by a single belt strand or by multiple side-by-side strands.

The second conveyor belt 16 is supported on wear strips 48 mounted to a conveyor frame 50. The transfer device 20 is also mounted to a frame 52 between the two conveyor belts. The transfer device has a cantilevered comb portion 54 comprising a plurality of parallel fingers 56 extending from a bridge 58 out over the sprocket 44 to a distal end 57. The distal end of the cantilevered portion extends proximate to the outer conveying surface atop the ribs of the raised-rib belt 12. The fingers extend into the spaces 30 between the ribs to strip cans 26 from or deposit cans onto the belt. In applications without a raised-rib belt, the transfer plate would not need fingers. Instead, the cantilevered portion could form a rectangular top transfer surface extending out to a distal edge close to the outer conveying surface of the first conveyor belt. A recessed rear portion 60 of the transfer system at the opposite end from the comb portion includes a plurality of rollers 62 laid out in parallel with their axes 64 parallel to the second direction 18 and perpendicular to the first direction 14. Axles 66 at one end of the rollers are coupled to flexible shafts of a roller drive 68 driven by a motor 70. An example of such a roller drive unit is disclosed in U.S. Pat. No. 4,313,536, "Conveyor and Control Therefor," Feb. 2, 1982, to Frederick E. Fauth. The disclosure of the patent is incorporated in this description by reference. Other roller drives may be used instead. For example, the rollers may be driven by drive-belt systems or geared together or individually driven by associated motors. The roller drive 68 rotates the rollers 62 about the roller axes 64 to roll cans 26 atop the rollers along the first direction 14.

Figure 4:
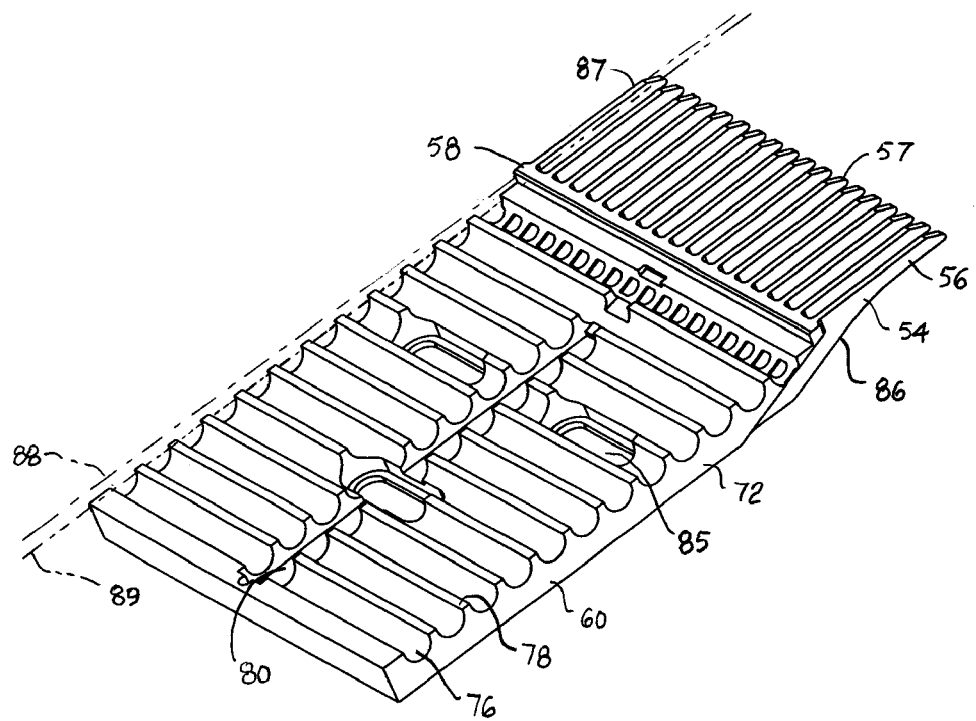
FIG. 4 is an isometric view of a finger transfer plate in a transfer system of FIG. 1.

As shown in FIGS. 2-4, the rollers 62 are supported in the rear portion 60 of one or more side-by-side transfer plates 72. The plate shown includes the cantilevered comb portion 54 and the recessed rear portion 60 as a single molded piece. The rear portion has an alternating series of grooves 76 and ridges 78 that extend parallel to the second direction 18 and perpendicular to the first direction 14. Each groove is semicircular to conform to the roller 62 and provide a smooth bearing surface to support the rotating roller with a salient portion of the rollers protruding slightly above the ridges to support conveyed articles. The grooves may be lined with a wear-resistant material. The rollers are small in diameter and spaced close together relative to the footprint of the articles being conveyed to eliminate trip points. The ridges separate the rollers from each other. An elongated depression 80 in the rear portion transversely intersects the grooves and ridges. The depression extends more deeply into the rear portion of the transfer plate 72 than the grooves and accommodates a holddown retainer 82, which fastens to the plate to hold the rollers in place. Ridges and semicircular grooves in the retainer mirror those in the transfer plate to accommodate the rollers. Each roller may be a single long roller or may be composed of roller segments joined end to end. The diameter of the rollers is shown reduced in the example of FIG. 3 at the positions 84 of the holddown retainers. Slots 85 formed in the rear portion 60 of the transfer plate admit mounting hardware to fasten the plate to the support frame 52. As seen in FIG. 2, the side profile of the transfer plate is minimal from top to bottom.

As shown in FIG. 4, the bottom 86 of the comb portion 54 of the transfer plate 72 is contoured to better match the circle made by the raised-rib belt as it articulates about the sprocket. And the bridge 58 of the comb is narrow, which allows some of the rollers to reside above the raised-rib belt's sprocket 44. The fingers 56 have upper surfaces 87 that define a first plane 88 at a level above the level of a second plane 89 defined by the ridges 78 of the transfer plate 72. As shown in FIG. 2, the topmost points 90 of the rollers 62 and the tops 32 of the ribs 28 in the raised-rib belt are more or less coplanar with the first plane 88 to provide for a smooth transfer of cans 26. The top of the holddown retainer 82 and the top 92 of the second conveyor belt also lie in that same plane.

The transfer system may be operated in either direction. When the transfer system is operated to offload cans, the raised-rib belt 12 advances to the left in FIGS. 1 and 2. Cans 26 are stripped from the raised-rib belt along the tops of the fingers 56 of the transfer plates 72. The cans then encounter the powered rollers 62 rotating counterclockwise in FIG. 2 to push the cans to the left and onto the second conveyor belt 16, which operates as a discharge conveyor. Because the distance D between the release point 94 of the raised-rib belt and the first roller 62' is less than the footprint of the cans 26 and because the powered rollers continue to rotate until the last cans have cleared, no cans can be stranded atop the transfer plate. Thus, the transfer system is self-clearing.

When the transfer system is operated to load cans onto the raised-rib belt 12, the second conveyor belt 16 is operated as an infeed conveyor advancing, for example, up the sheet in FIG. 1. A guide 96 extending across the belt directs the cans to the rollers 62 supported on the transfer plate 72. The powered rollers, which rotate clockwise in FIG. 2, push the supported cans onto the tops of the fingers 56 and onto the ribs 28 of the raised-rib belt 12 advancing to the right in FIGS. 1 and 2. As in the other example, the transfer system is self-clearing, allowing no straggling cans to be stranded.

The invention has been described with reference to an exemplary version. One skilled in the art will appreciate that some of the details may be realized in other ways without departing from the invention as claimed.

What is claimed is:

1. A transfer plate comprising:
 a cantilevered portion, devoid of rollers, at a first end of the transfer plate extending outward of the first end in a first direction to a distal end and forming an upper transfer surface;
 a rear portion molded as a single piece with the cantilevered portion at an opposite second end of the transfer plate and including an alternating series of grooves and ridges extending in a second direction perpendicular to the first direction;
 wherein the upper transfer surface defines a first plane and wherein the ridges define a second plane below the first plane.

2. A transfer plate as in claim 1 wherein the cantilevered portion forms a comb having a plurality of parallel fingers extending outward of the first end in the first direction.

3. A transfer plate as in claim 2 wherein the fingers form extensions of the upper transfer surface.

4. A transfer plate as in claim 1 wherein the grooves are semicircular.

5. A transfer plate as in claim 1 wherein the rear portion further includes a depression elongated in the first direction and intersecting the series of grooves and ridges for receiving a retainer for holding rollers rotatably in place in the grooves.

6. A transfer plate as in claim 5 wherein the depression extends more deeply into the rear portion than the grooves.

7. A transfer system comprising:
a transfer plate as in claim 1;
a conveyor belt advancing along the first direction and having an outer conveying surface proximate to the distal end of the cantilevered portion;
a plurality of rollers supported in the grooves along roller axes parallel to the second direction with a salient portion of each of the rollers extending above the ridges;
a roller drive coupled to the rollers to rotate the rollers about the roller axes.

8. A transfer system as in claim 7 wherein the conveyor belt is a raised-rib belt having a series of ribs parallel to the first direction and separated by spaces and wherein the cantilevered portion includes a plurality of fingers that are received in the spaces between the ribs.

9. A transfer system comprising:
a one-piece, molded transfer plate including:
a cantilevered portion at a first end of the transfer plate extending outward of the first end in a first direction to a distal end;
a recessed rear portion at an opposite second end of the transfer plate;
a reversing element disposed partly below the cantilevered portion of the transfer plate;
a first conveyor belt advancing along the first direction and around the reversing element and having an outer conveying surface proximate to the distal end of the cantilevered portion of the transfer plate;
a plurality of rollers supported in the recessed rear portion along roller axes parallel to the second direction;
a roller drive coupled to the rollers to rotate the rollers about the roller axes.

10. A transfer system as in claim 9 wherein the cantilevered portion includes a plurality of parallel fingers and wherein the first conveyor belt is a raised-rib conveyor belt having a plurality of ribs separated by spaces running in the first direction, wherein the fingers are received in the spaces between the ribs above the reversing element.

11. A transfer system as in claim 9 wherein the recessed rear portion includes an alternating series of grooves and ridges extending in a second direction perpendicular to the first direction, wherein the rollers are supported in the grooves.

12. A transfer system as in claim 9 further comprising a second conveyor belt advancing parallel to the roller axes adjacent to the plurality of rollers, wherein conveyed articles are transferred across the rollers and the cantilevered portion between the first conveyor belt and the second conveyor belt.

13. A transfer system as in claim 9 wherein at least some of the rollers are disposed above the reversing element.

14. A transfer system as in claim 9 wherein the cantilevered portion is devoid of rollers.

15. A transfer system comprising:
a conveyor belt advancing on an upper carryway run along a first direction and having a series of ribs parallel to the first direction and separated by spaces;
a sprocket engaging the conveyor belt and redirecting the conveyor belt between the upper carryway run and a lower return run;
a plurality of parallel fingers extending along the upper carryway run above the sprocket into the spaces between the ribs of the conveyor belt;
a plurality of parallel powered rollers rotatable on roller axes perpendicular to the first direction disposed adjacent to the fingers to roll conveyed articles along the first direction;
wherein the topmost point of the rollers is coplanar with the tops of the fingers.

16. A transfer system as in claim 15 further comprising a transverse conveyor belt advancing parallel to the roller axes adjacent to the plurality of powered rollers wherein the conveyed articles are transferred across the powered rollers and the fingers between the conveyor belt and the transverse conveyor belt.

17. A transfer system as in claim 15 wherein at least some of the powered rollers are disposed above the sprocket.

18. A transfer system as in claim 15 comprising one or more side-by-side transfer plates having a comb portion at a first end defining the plurality of parallel fingers extending outward of the first end along the first direction and a rear portion at an opposite second end of the transfer plate including an alternating series of grooves and ridges extending in a second direction perpendicular to the first direction, wherein the powered rollers reside in the grooves.

19. A transfer system as in claim 18 wherein the comb portion is devoid of rollers.

20. A transfer system as in claim 18 wherein the rear portion of the transfer plate further includes a depression in the first direction intersecting the series of grooves and ridges and a holddown retainer received in the depression to retain the rollers in the grooves with freedom to rotate.

* * * * *